United States Patent [19]

Meiller et al.

[11] Patent Number: 4,484,723
[45] Date of Patent: Nov. 27, 1984

[54] AIR-SPRUNG SEAT

[75] Inventors: Hermann Meiller, Amberg; Johann Grassl, Schwandorf, both of Fed. Rep. of Germany

[73] Assignee: Willibald Grammer, Amberg, Fed. Rep. of Germany

[21] Appl. No.: 344,627

[22] Filed: Feb. 1, 1982

[30] Foreign Application Priority Data

Sep. 16, 1981 [DE] Fed. Rep. of Germany ....... 3136756

[51] Int. Cl.³ .............................................. A47C 3/30
[52] U.S. Cl. ..................................... 248/550; 297/307
[58] Field of Search ............... 248/550, 631; 297/306, 297/307; 200/153 L, 153 LB; 251/251

[56] References Cited

U.S. PATENT DOCUMENTS

| | | | |
|---|---|---|---|
| 3,398,248 | 8/1968 | Klauss | 200/153 L |
| 3,954,245 | 5/1976 | Coustin | 248/550 |
| 3,999,800 | 12/1976 | Penzotti | 248/550 |
| 4,022,411 | 5/1977 | Rumsey | 248/631 |
| 4,198,025 | 4/1980 | Lowe | 248/550 |

FOREIGN PATENT DOCUMENTS 2753105 11/1977 Fed. Rep. of Germany ...... 248/550

*Primary Examiner*—Reinaldo P. Machado
*Assistant Examiner*—Alvin Chin-Shue
*Attorney, Agent, or Firm*—Louis E. Marn

[57] ABSTRACT

An air-sprung vehicle seat wherein adjustment in respect of weight is provided by a control cam and two spaced-apart switches actuable thereby upon relative movement thereof in dependence on a variation in the seat height. One of the switches controls the supply of air into the air spring and the other the discharge of air therefrom. The switches each have two actuating stages such that, with increasing actuation, the first actuating stage serves as an idle stage and it is only in the subsequent second actuating stage that the respective switch is switched on, while, with decreasing actuation, a switch which has been switched on remains switched on until both actuating stages have passed. The control cam has two control portions such that, in both directions of actuating movement, the control portion which moves the respective switch being actuated into the first actuating stage is operative first and it is only upon further movement in the same direction that the second control portion is operative to move the respective switch into its second actuating stage. This arrangement reliably prevents a continuous air supply to and discharge from the air spring, due to the seat oscillating on its spring.

5 Claims, 4 Drawing Figures

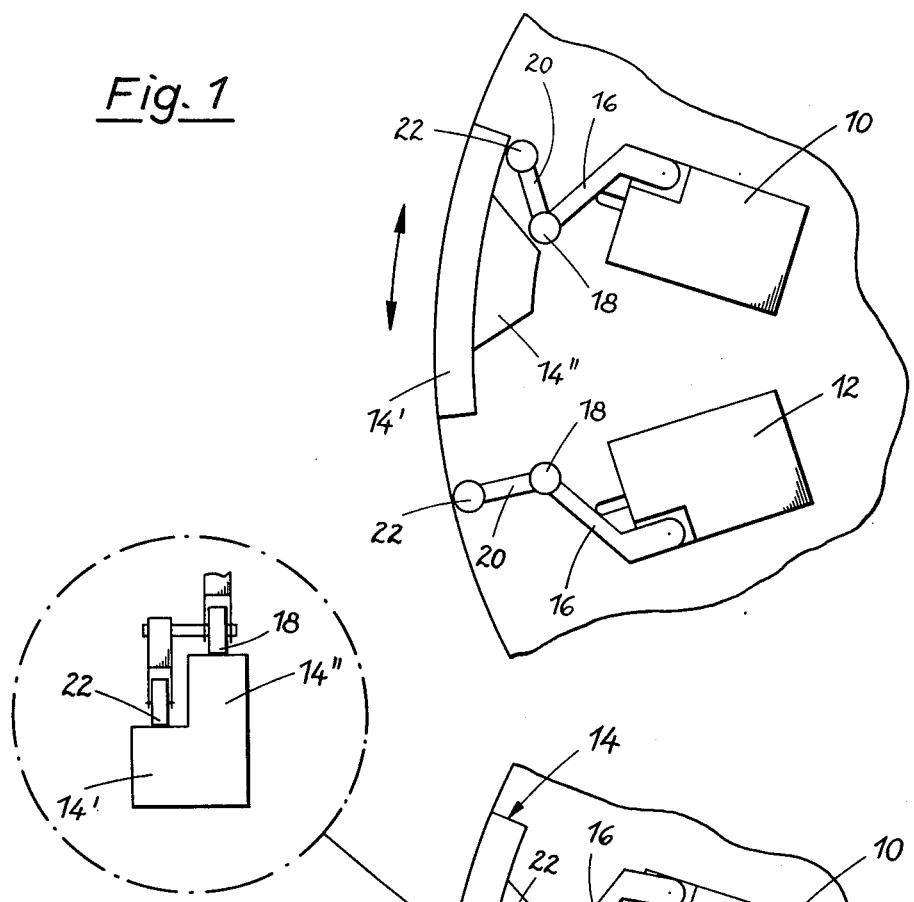
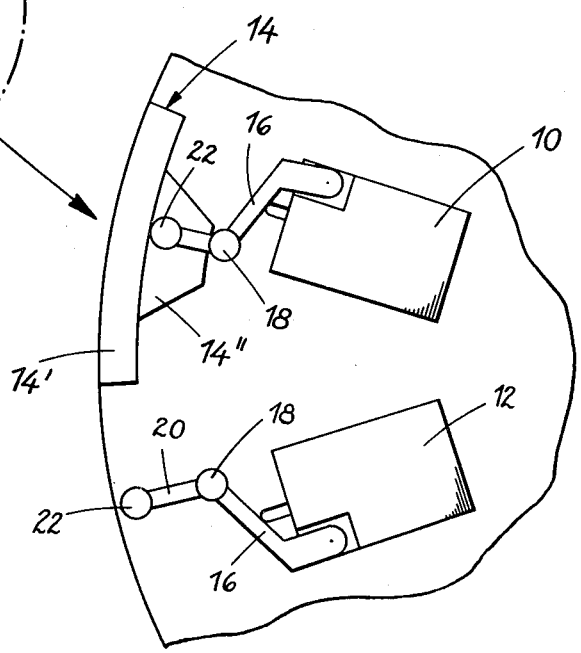
Fig. 1
Fig. 2

AIR-SPRUNG SEAT

BACKGROUND OF THE INVENTION

The invention relates to an air-sprung vehicle seat wherein a seat frame carrying a seat cushion is supported on a base frame by way of an air spring, and wherein there is a means for adjustment in respect of weight comprising a control cam means and two spaced-apart switch means, one of which switch means controls the supply of air into the air spring and the other controls the discharge of air out of the air spring, and wherein the two switch means are movable relative to the control cam means in dependence on the height of the seat frame from the base frame, and are actuable by the control cam means.

In a air-sprung vehicle seat of this kind, the seat always remains at the same height, irrespective of the weight of the person sitting thereon. If a heavier person sits down on the seat, then the seat moves resiliently downwardly, whereby the switch means for supplying air to the air spring is switched on by way of the control cam means, so that the seat returns to its previous level. Conversely, when a lighter person sits on the seat, the switch for the discharge of air out of the air spring is switched on by way of the control cam means, so that the seat also returns to its previous level.

If the seat is to be held precisely at a given height, then the two switch means must be disposed relatively close together. However, unless further arrangements are made, this has the result that, in operation, when the seat is continuously moving up and down, air is continuously suypplied to and discharged from the air spring, which results in an undesirably high level of air consumption and can also result in critical oscillatory movement.

In order to remedy this disadvantage, DOS (German laid-open application) No 27 53 105 proposes that the control cam means or the switch means may be arranged on a freely displaceable drag or entrainment disc which, when the seat oscillates in both directions, is entrained by a certain distance behind the seat. In this arrangement, a certain degree of friction must be opposed to the movement of the disc so that the disc remains in a rest condition upon deflection of the seat in one direction. On the other hand, the connecting linkage member which entrains the disc after having covered the above-mentioned certain distance and on which the seat frame is guided is arranged closely adjoining the disc and is pivotal about the same axis of rotary movement as the disc so that in operation, and more particularly when the arrangement is suffering from fouling, there is the danger that the disc may be entrained immediately, without a trail effect. This however then also gives rise to the above-indicated disadvantage.

SUMMARY OF THE INVENTION

An object of the present invention is so to design an air-sprung vehicle seat of the above-indicated kind, as to prevent a continuous supply of air to the air spring and a continuous discharge of air from the air spring, in operation of the seat arrangement, when the seat flexes, in an operationally reliable and dependable manner.

According to the present invention, this object is attained in that the switch means each have two actuating stages such that, upon increasing actuation thereof, the first actuating stage acts as an idle stage and the respective switch means is switched on only in the subsequent second actuating stage, while with decreasing actuation of the switch means, the respective switch means which is switched on remains switched on until both actuating stages have been passed, and that the control cam means has two control portions, wherein, in both directions of movement, the first control portion which displaces the respective switch means being actuated into the first actuating stage is operative initially and the second control portion which moves the respective actuated switch means into the second actuating stage is operative only upon further movement in the same direction.

Therefore, instead of the control cam means being in the form of an entrainment disc, according to the invention the control cam means is of a two-stage configuration and two-stage actuating switch means are used. Such an arrangement is substantially more reliable in operation than the known arrangement which is based on frictional forces.

Desirably, the switch means are rocker roller lever switches in which a rocker lever which is resiliently urged into its perpendicular or vertical position against an abutment is pivotally connected to a main actuating member which is displaceable transversely with respect to the direction of the relative movement between the control cam means and the respective switches, and the first control portion of the control cam means extends over the entire length of the cam means in the direction of movement and co-operates with the free end of the rocker lever, while the second control portion which is laterally displaced with respect to the first control portion in the direction of movement co-operates with the main actuating member.

For reasons concerning friction, it is advantageous, in a vehicle seat in which the seat frame is mounted on pivotal arms, for the two-stage control cam means to be arranged below the seat frame pivotally about a pivot pin in a horizontal plane, and for the control cam means to have a vertical portion with a control slot which extends vertically, while a horizontal entrainment pin which is secured to a pivotal arm engages into the control slot. Such an arrangement is substantially more compact, in comparison with the known arrangement in which the control cam means which is formed as an entrainment disc is pivotal about the axis of a connecting linkage member or pivotal arm.

Preferably, the control slot is of an arcuate configuration whereby it is possible to achieve greater movements of the control cam means and an angular deflection of the control cam means, which is linear with respect to the difference in seat height. More particularly, the greater the degree of curvature, the greater is the distance covered by the control cam means.

It is also desirable for the switch means to be fixed on a plate which is pivotal about the same pivot point as the control cam means and which can be fixed in a plurality of positions, for setting the respective height of the seat. Further advantages, details and features of the invention will be apparent from the following description of a preferred embodiment with reference to the accompanying drawings.

BRIEF DESCRIPTION OF THE DRAWINGS

FIG. 1 is a diagrammatic view in which the control cam means and the two switch means are illustrated in a first position, FIG. 2 shows the same view as FIG. 1, but with the switch means in a different position.

DESCRIPTION OF THE PREFERRED EMBODIMENT

Figure 3:
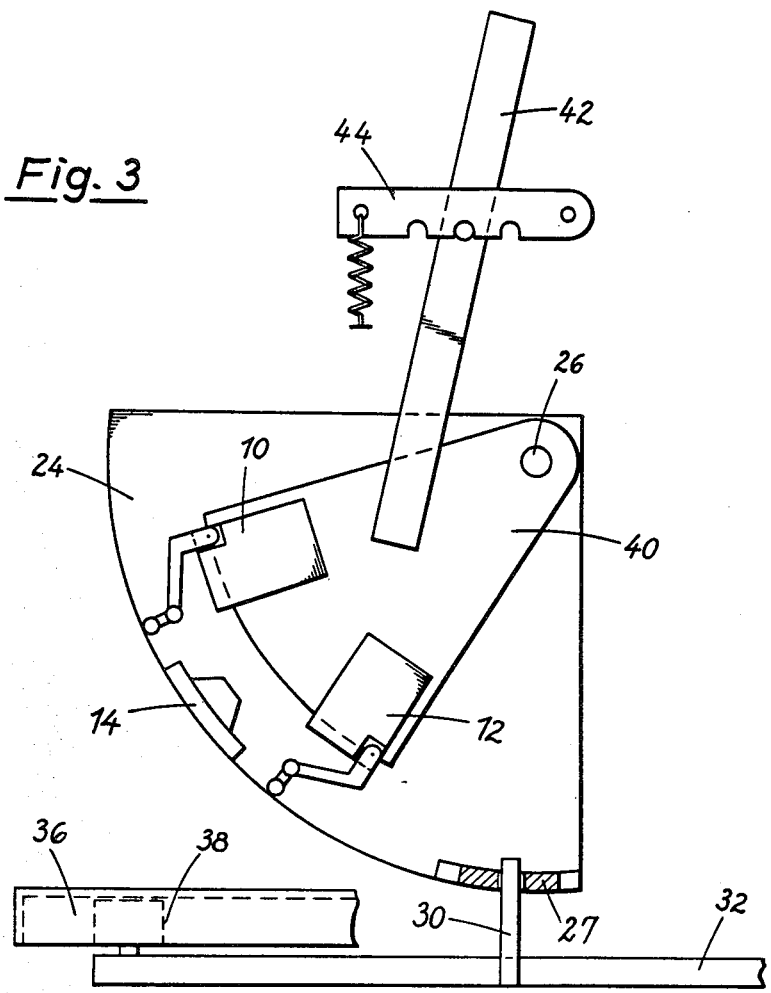
FIG. 3 shows a plan view of the arrangement according to the invention, in the illustrated embodiment.

The vehicle seat according to the invention is not shown in its entirety in the drawing as air-sprung vehicle seats are generally known. In the vehicle seat according to the invention, there are two switches 10 and 12, of which one switch 10 is operable to control the supply of air to the air spring, while the other switch 12 is operable to control the discharge of air from the air spring. The switches 10 and 12 can actuate corresponding valves. However, the switch 10 which is operable to control the supply of air to the air spring can also switch a compressor on and off directly.

The switches 10 and 12 co-operate with a control slider or cam means 14 which is displaced relative to the switches 10 and 12 when the seat flexes. The control cam means 14 is of a two-stage configuration and comprises a first control portion 14' and a second control portion 14''. The first control portion 14' extends over the entire length of the control cam means, while the second control portion 14'' which is disposed laterally of the first control portion 14' extends only over a part of the full length of the control cam means, being arranged in the middle of the control cam means in the longitudinal direction thereof.

The switches 10 and 12 are switches referred to as rocker roller lever switches and each have two actuating stages. Each switch has a main actuating member 16 in the form of a lever which is pivotally connected at one end to the switch 10 or 12 respectively, while at its other end the lever 16 carries a roller 18 which co-operates with the trapezoidal second control portion 14'' of the control cam. In this arrangement, the lever 16 presses on the change-over switching member (not shown) by way of a push rod. A rocker lever 20 is pivotally mounted to the end of the lever 16 which also carries the roller 18. The rocker lever 20 is spring-loaded into its perpendicular or vertical position, against an abutment, this being the condition shown for example in relation to the switch 12 in FIG. 2. From that position, the rocker lever 20 can pivot only in one direction, namely towards the lever 16. The abutment prevents the lever 20 from pivoting in the other direction. At its free end, the rocker lever 20 also has a roller 22 which co-operates with the first control portion 14' of the control cam means. The position of the switches 10 and 12 in this arrangement is such that, when the control cam means is deflected out of the central position thereof, the rocker lever 20 of the respective switch is first pivoted by the control portion 14'.

The above-described arrangement operates in the following manner.

If for example the control cam means 14 moves from its central position towards the switch 10, because the air spring of the air-sprung vehicle seat is compressed, then the roller 22 of the lever 20 first comes into contact with the first control portion 14' of the control cam means 14 and the lever 20 is pivoted against the spring loading thereon. When this happens however, the main actuating member, namely the lever 16, is still not actuated, this being the condition shown in FIG. 1. This is the first actuating stage which acts as an idle stage in the mode of increasing actuation. It is only upon further movement of the control cam means 14 towards the switch 10 that the roller 18 comes to bear against the inclined flank or side surface of the second control portion 14'' whereby the lever 16 is depressed and thus, in the second actuating stage, the switch 10 switches on the supply of air to the air spring (see FIG. 2). When this happens, the lever 20 moves into its upright or vertical position in which it is spring-loaded against the above-mentioned abutment, as soon as the roller 18 runs on the highest part of the control cam configuration of the control portion 14''. As can be seen from FIG. 2, the difference in height between that part of the control cam configuration of the second control portion 14'' and the control cam configuration of the first control portion 14' is equal to the length of the rocker lever 20. Air now flows continuously into the air spring so that the air spring expands and the control cam means begins to move towards the switch 12. When this happens, the roller 18 leaves the highest part of the control cam configuration of the second control portion 14''. However, it does not follow the flank of the second control portion 14'' but remains at the above-indicated level because the perpendicularly standing rocker lever 20 which is moving with the roller 22 along the control cam configuration of the first control portion 14' prevents the roller 18 from moving away from the switch 10 which thus remains switched on, as shown in FIG. 1 in relation to the switch 12. Therefore, air continues to be supplied to the air spring so that the height of the seat increases until the roller 22 runs off the first control portion 14' of the control cam means 14 and the control cam means is disposed in its central position. In this way, the static height of the seat is determined, irrespective of the weight of the driver.

A similar procedure occurs in the event of reverse movement in regard to the switch 12, by means of which air is let out of the air spring.

If now oscillatory movements occur in driving the vehicle, then the control cam means will oscillate back and forth out of its central position; when this happens, up to a given magnitude of oscillatory movement, it is only the rocker levers 20 of the respective switches which are engaged by the first control portion 14' and thereby pivoted, so that the switches 10 and 12 are not actuated. It is only when oscillatory movements of greater amplitude occur that the switches are actuated by way of the second control portion 14'' and the respective rollers 18.

Figure 4:
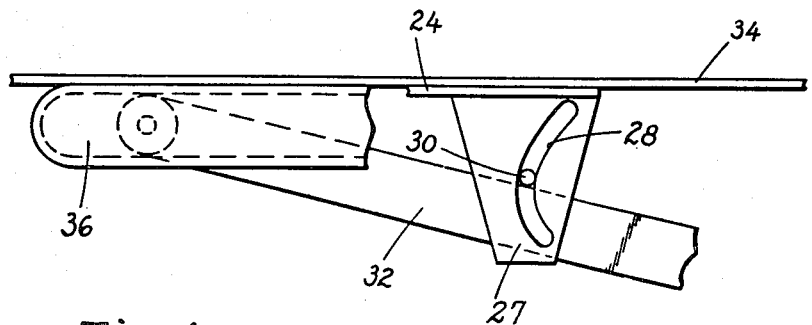
FIG. 4 shows a side view of part of the arrangement shown in FIG. 3.

Reference will now be made to FIGS. 3 and 4. In the preferred embodiment, the control cam means 14 is fixed on a plate 24 which is in the form of a sector of a circle. The plate 24 is arranged in a horizontal plane below the seat frame which carries the seat cushion, and is pivotal in the horizontal plane about a pivot 26. The plate 24 has a vertical portion 27 in which there is a control slot 28. An entrainment pin member 30 is welded to one pivotal arm 32 of the driving seat and engages into the control slot 28. The arm 32 is guided movably on the support frame 34 in a slide assembly 36 into which it engages, by means of a transverse pin member carrying a roller 38. If the seat flexes under the weight thereon, the pivotal arm 32 is moved whereby the entrainment pin 30 is moved vertically and moves both vertically and horizontally with respect to the seat frame 34 to which the plate 24 carrying the control cam means 14 is fixed. If the control slot 28 were arranged so as to extend precisely vertically, then only the horizontal movement of the entrainment pin 30 would be responsible for rotary movement of the plate 24 and thus the control cam means 14 about the pivot 26. By virtue of the arcuate configuration of the control slot 28 however, the vertical movement is also responsible for moving the control cam means 14 about the pivot 26. In this way, by suitable selection in regard to the configuration of the control slot 28, it is possible to provide that the angle of rotary movement of the cam means 14 about the pivot 26 varies linearly with the difference in height of the seat frame 34. In addition, the arcuate configuration of the control slot 28 makes it possible to achieve an increase in the angle of rotary movement of the control cam means 14, thereby enhancing the degree of accuracy in the mode of operation of the arrangement.

A plate 40 is also connected to the seat frame 34 pivotally about the same pivot point or axis as the control cam member 14 and carries the switches 10 and 12 which co-operate with the control cam means 14. A lever 42 which is welded to the plate 40 can be retained in a plurality of detent positions, by means of a spring-loaded locking member 44. In this way, the plate 40 and thus the switches 10 and 12 can be fixed in a plurality of positions in regard to rotary movement thereof. These positions determine the height of the seat frame 34 from the bottom frame (not shown).

What is claimed is:

1. An air-sprung vehicle seat including a seat frame for carrying a seat cushion and supported on a base frame by way of an air spring, and a means for adjustment in respect of weight, comprising a control cam means and two spaced-apart switch means, one of said switch means supplying air into said gas spring and said other switch means discharging air from said gas spring, said two switch means being movable relative to said control cam means in dependence on the height of said seat frame from said base frame and being actuated by said control cam means, each of said switch means having two actuating stages such that upon increasing actuation thereof a first actuating stage acts as an idle stage and said respective switch means is switched on only in a subsequent second stage, while with decreasing actuation of said switch means, said switch means which is switched on remains switched on until occurrence of both actuating stages, each of said switch means being a rocker roller lever switch comprising a rocker lever resiliently urged into an upright position against an abutment and pivotally connected to a main actuating member transversely displaceable with respect to direction of relative movement between said control cam means and said switches, and wherein said control cam means has two control portions such that in both directions of movement a first control portion which displaces said respective switch means being actuated into said first actuating stage thereof is initially operative and a second control portion which moves said respective actuated switch means into said second actuating stage is only operative upon further movement of said control cam means in the same direction, said first control portion of said control cam means being extendable over an entire length of said control cam means in direction of movement and cooperating with a free end of said rocker roller lever switch, said second control portion of said control cam means being laterally displaceable with respect to said first control portion in direction of movement cooperating with said main actuating member.

2. The air-sprung vehicle seat as set forth in claim 1 wherein said main actuating member has a roller adapted to bear against said second control portion and wherein a roller is also provided at said free end of said rocker roller lever switch thereby to roll against said first control portion.

3. The air-sprung vehicle seat as set forth in claims 1 or 2 wherein said seat frame is supported on a pivotal arm assembly and wherein said control cam means is arranged below said seat frame pivotally mounted in a horizontal plane about a pivot means said control cam means having a vertical portion including a control slot extending at least partly vertically and wherein a horizontal entrainment pin secured to a said pivotal arm extends into said control slot.

4. The air-sprung vehicle seat as set forth in claim 3 wherein said control slot is of an arcuate configuration.

5. The air-sprung vehicle seat as set forth in claim 4 wherein said switch means are fixed on a plate pivotally mounted about said pivot means said plate being fixed in a plurality of positions for setting said seat at a respective height.

* * * * *

UNITED STATES PATENT AND TRADEMARK OFFICE
CERTIFICATE OF CORRECTION

PATENT NO. : 4,484,723

DATED : NOVEMBER 27, 1984

INVENTOR(S) : HERMANN MEILLER & JOHANN GRASSL

It is certified that error appears in the above-identified patent and that said Letters Patent is hereby corrected as shown below:

Col. 5, line 43, Claim 1, after "second" insert -- actuating --.

Signed and Sealed this

Twenty-first Day of May 1985

[SEAL]

Attest:

DONALD J. QUIGG

Attesting Officer  Acting Commissioner of Patents and Trademarks